United States Patent
Coulbeck et al.

(10) Patent No.: US 11,661,522 B2
(45) Date of Patent: May 30, 2023

(54) ALIPHATIC CERAMICS DISPERSANT

(71) Applicant: Lubrizol Advanced Materials, Inc., Cleveland, OH (US)

(72) Inventors: Elliot Coulbeck, Bury (GB); Dean Thetford, Norden (GB)

(73) Assignee: Lubrizol Advanced Materials, Inc, Cleveland, OH (US)

( * ) Notice: Subject to any disclaimer, the term of this patent is extended or adjusted under 35 U.S.C. 154(b) by 120 days.

(21) Appl. No.: 17/349,987

(22) Filed: Jun. 17, 2021

(65) Prior Publication Data

US 2021/0309876 A1  Oct. 7, 2021

Related U.S. Application Data

(62) Division of application No. 16/466,067, filed as application No. PCT/US2017/065319 on Dec. 8, 2017, now Pat. No. 11,066,565.

(60) Provisional application No. 62/432,064, filed on Dec. 9, 2016.

(51) Int. Cl.
| | |
|---|---|
| *C09D 11/322* | (2014.01) |
| *B41M 1/34* | (2006.01) |
| *B41M 5/00* | (2006.01) |
| *C04B 41/45* | (2006.01) |
| *C04B 41/50* | (2006.01) |
| *C04B 41/87* | (2006.01) |
| *C09C 1/00* | (2006.01) |
| *C09C 3/04* | (2006.01) |
| *C09D 11/033* | (2014.01) |
| *C09D 11/037* | (2014.01) |
| *C09D 11/108* | (2014.01) |
| *C09D 11/36* | (2014.01) |
| *B41J 2/01* | (2006.01) |
| *C09K 23/00* | (2022.01) |
| *C09D 11/326* | (2014.01) |

(52) U.S. Cl.
CPC ............ *C09D 11/322* (2013.01); *B41J 2/01* (2013.01); *B41M 1/34* (2013.01); *B41M 5/007* (2013.01); *B41M 5/0011* (2013.01); *B41M 5/0023* (2013.01); *C04B 41/4539* (2013.01); *C04B 41/5025* (2013.01); *C04B 41/87* (2013.01); *C09C 1/0009* (2013.01); *C09C 3/041* (2013.01); *C09D 11/033* (2013.01); *C09D 11/037* (2013.01); *C09D 11/108* (2013.01); *C09D 11/326* (2013.01); *C09D 11/36* (2013.01); *C09K 23/002* (2022.01); *C09K 23/003* (2022.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 10,675,889 B2 * | 6/2020 | Thetford | ............... | B41M 7/0054 |
| 2002/0197569 A1 * | 12/2002 | Elst | ......... | G03C 1/346 |
| | | | | 430/502 |
| 2007/0256455 A1 * | 11/2007 | Berden | ............... | C03C 17/002 |
| | | | | 65/66 |
| 2009/0117276 A1 * | 5/2009 | Ito | ........... | C04B 41/89 |
| | | | | 427/256 |

(Continued)

FOREIGN PATENT DOCUMENTS

EP    1953196 A1 *  8/2008  .............. C09C 1/00

*Primary Examiner* — Manish S Shah
(74) *Attorney, Agent, or Firm* — Samuel B. Laferty; Vincent Cortese; Michael Miller

(57) ABSTRACT

The invention provides dispersed inorganic mixed metal oxide pigment compositions in a hydrocarbon media utilizing a dispersant having polyisobutylene succinic anhydride structure reacted with a non-polymeric amino ether/alcohol to disperse a mixed metal oxide pigment in the media. The metal oxide pigment is of the type used to color ceramic or glass articles. A milling process using beads is also described to reduce the mixed metal oxide particle size to the desired range. A method of using the mixed metal oxide dispersion to digitally print an image on a ceramic or glass article using the dispersion jetted through a nozzle and subsequently firing the colored article is also described.

10 Claims, No Drawings

(56) References Cited

U.S. PATENT DOCUMENTS

| | | | |
|---|---|---|---|
| 2011/0152142 A1* | 6/2011 | Psaila | C10M 125/10 |
| | | | 508/165 |
| 2012/0282311 A1* | 11/2012 | Schmid | C09C 1/0024 |
| | | | 501/153 |
| 2013/0196124 A1* | 8/2013 | Flores | C09D 11/326 |
| | | | 428/196 |
| 2013/0236732 A1* | 9/2013 | de Oliveira | C23C 18/143 |
| | | | 427/535 |
| 2013/0342593 A1* | 12/2013 | Fornara | C08G 69/44 |
| | | | 106/31.65 |
| 2014/0044894 A1* | 2/2014 | Shipway | E04F 15/02188 |
| | | | 428/29 |
| 2015/0015638 A1* | 1/2015 | Shipway | C09D 11/322 |
| | | | 106/31.13 |
| 2015/0291841 A1* | 10/2015 | Fores Fernandes | C04B 41/009 |
| | | | 524/606 |
| 2017/0183518 A1* | 6/2017 | Cartridge | C04B 41/83 |
| 2017/0260409 A1* | 9/2017 | Thetford | C09D 11/326 |

\* cited by examiner

ALIPHATIC CERAMICS DISPERSANT

This application is a divisional application based on U.S. patent application Ser. No. 16/466,067, filed on Jun. 3, 2019, which claims priority from PCT Application Serial No. PCT/US2017/065319, filed on Dec. 8, 2017, which claims the benefit of U.S. Provisional Application No. 62/432,064, filed on Dec. 9, 2016.

FIELD OF INVENTION

The dispersants and dispersed mixed metal oxide pigment compositions are useful for the coloration of ceramic articles and glass. The dispersed pigments are those of the type that develop their coloration during high temperature ceramic firing of a coating on the ceramic article or glass. The dispersed pigments are desirably suitable for jetting through a nozzle during a digitally controlled printing operation. The dispersants from polyisobutylene coupled to a dicarboxylic anhydride (such as maleic anhydride) and then reacted with a non-polymeric amino ether/alcohol.

BACKGROUND OF THE INVENTION

Civilizations have made a variety of ceramic articles such as cooking and serving vessels, water and other fluid containers, tiles, bricks, etc., for thousands of years. These were typically colored or decorated with metal oxide type pigments that developed colors or more intense colors during an elevated temperature firing of the pigment and ceramic article. The metal oxide type coloration pigments were thought to chemically interact and interpenetrate and develop colors at high temperatures with the ceramic composition and/or with more glassy compositions sometimes applied with the coloration pigments or subsequently applied. The more glassy compositions were often to provide impermeable or barrier properties to the outer surface of the ceramic article (to protect the ceramic article from environmental materials with which it might come into contact).

With conventional organic pigments and the few inorganic pigments (e.g., $TiO_2$, silica, and talc) in polymeric organic binder, the particle size and particle uniformity are very important to achieve consistent and intense coloration. Inorganic mixed metal oxide pigments used in inorganic ceramic coloration are generally not as well understood as organic pigments. The particle size of the inorganic mixed metal oxide pigments generally has not been studied and controlled to the extent that particle sizes of pigments has been controlled for use in polymeric organic coatings and inks.

U.S. Pat. No. 3,846,127 discloses an imaging system comprising photosensitive pigment dispersed in an insulating binder and exposed to actinic electromagnetic radiation. The pigment particles are treated with polyisobutylsuccinic anhydride or derivatives thereof before being incorporated in the imaging layer.

WO 87/05924 discloses dispersions of solids in organic liquids where the dispersant has a molecular weight from 500 to 10,000. The solids can be inorganic or organic pigments. The use can be in paints, enamels, printings inks and other surface coatings, including articles made from plastics and rubber. Examples 1-13 include polyisobutylene based dispersants.

US 2008/0182927 discloses PIBSAs as dispersants for metal oxide nanoparticles in liquid including toluene, xylene, mineral spirits, hexanes, and phenoxyisopropanol. The metal oxides mentioned by name include those of zinc, zirconium, cerium titanium, aluminum, indium and tin. In their examples, they used alumina with a particle size of 30 nm, zirconia with a particle size of 15 nm, ceria with a particle size slightly less than 100 nm, and zinc oxide with a particle size of 30 nm.

SUMMARY OF THE INVENTION

More recently the printing industry has shifted away from traditional printing methods and is using digital printing instead. When considering converting mixed metal oxide dispersions for coloring ceramic articles from conventional gravure or screen-printing processes, these ink formulations require better dispersants in order that they meet all the requirements needed to be jetted using a digital printer. There is also a need to quickly and efficiently reduce the particle sizes of inorganic metal oxide pigments by milling from their current commercially available sizes to $D_{50}$ number average particles sizes of less than 600 nm so the particles can be jetted through small openings of the ink jet printheads. While many pigments for conventional coatings or inks tend to be organic and have densities within 10 or 20 wt. % of the continuous organic media, mixed metal oxide pigments can have densities of 2 to 4 times that of the continuous phase, making such mixed metal oxide pigments much harder to keep dispersed as colloidal particles in an organic media.

A dispersant for mixed metal oxides has been identified as a reaction product of polyisobutylene with maleic acid and/or anhydride and subsequent reaction with a non-polymeric amino ether/alcohol. It has been found that the above dispersants show excellent ability to facilitate milling and disperse inorganic pigments (preferably mixed metal oxide pigments) to produce colloidally stable mixed metal oxide dispersions in non-aqueous, non-polar organic (hydrocarbon) media based ink jet inks for the coloration of ceramic tiles and glass using ink jet ink printers. Thus, according to the present invention, there is provided a composition comprising a particulate solid; a continuous media selected from aliphatic hydrocarbon, or blends thereof; and a dispersing agent being a reaction product of polyisobutylene with maleic acid and/or anhydride and subsequent reaction with a non-polymeric amino ether/alcohol.

Also provided is a method for milling the mixed metal oxide pigments using the reaction product of polyisobutylene with maleic acid and/or anhydride and subsequent reaction with a non-polymeric amino ether/alcohol in minimal time and with minimal contamination of the mixed metal oxide dispersion by wear components from the mill and beads used in milling. The dispersant functions to facilitate milling by colloidally stabilizing new surfaces created by milling and preventing aggregations of milled particles into larger aggregates. Also provided is a method of formulating a digital ink for ink jet printing using the reaction product of polyisobutylene with maleic acid and/or anhydride and subsequent reaction with a non-polymeric amino ether/alcohol dispersant of this disclosure. Also disclosed is a method of digitally printing using an ink jet printer and an ink with mixed metal oxide pigments and a reaction product of polyisobutylene with maleic acid and/or anhydride based dispersant.

DETAILED DESCRIPTION OF THE INVENTION

The invention relates to the use of a class of dispersants in ceramic ink jet inks formulations, to dispersions containing such dispersants together with a particulate solid (mixed metal oxides) and a hydrocarbon medium (aliphatic and optionally aromatic hydrocarbon, or blends thereof), and compositions comprising a particulate solid, a hydrocarbon medium and a dispersant and to their use in ceramic ink jet inks and mill-bases. Many formulations such as inks, paints and mill-bases require effective dispersants for uniformly distributing a particulate solid in a non-polar organic (hydrocarbon) medium.

In one embodiment, the invention relates to a pigment dispersion composition comprising:
 a) 20-79 wt. % of continuous liquid hydrocarbon media, including aliphatic hydrocarbon, non-polar fatty acid ester medium or combinations thereof;
 b) 20-60 wt. % of a mixed metal oxide ceramic pigment in particulate form that develops its full color intensity and hue after firing at elevated temperatures; and
 c) 1-20 wt. % of a dispersant being a reaction product of polyisobutylene with maleic acid and/or anhydride forming a PIBSA (polyisobutylene succan) that is then reacted at a molar ratio of 0.9:1 to 1.1:1 of succan anhydride groups of the PIBSA with a non-polymeric amino ether/alcohol.

In one embodiment, the invention relates to a process for milling an inorganic mixed metal oxide particulate, having a dry powder volume average particle diameter $D_{50}$ in excess of 2 micron, in a continuous non-polar organic (hydrocarbon) medium to a $D_{50}$ particle size of less than 600 nanometers, said process comprising:
 a) blending said continuous medium, said inorganic mixed metal oxide particulate, wherein said inorganic mixed metal oxide particulate is a mixed metal oxide pigment that develops its color intensity and hue after firing at elevated temperatures; optionally including a vitreous glaze material, having a dry powder volume average particle diameter in excess of 2 micron, and a dispersing agent being a reaction product of polyisobutylene with maleic acid and/or anhydride and subsequent reaction with a non-polymeric amino ether/alcohol;
 b) milling said mixed metal oxide pigment dispersed with said dispersing agent in said continuous medium using a bead mill for 5 minutes to 60 hours; and
 c) confirming the volume average particle diameter $D_{50}$ is less than 600 nanometers.

In one embodiment, the invention relates to a process for digitally printing on ceramic article or glass article substrate using an ink jetted through a nozzle comprising:
 a) providing a mixed metal oxide dispersed in a continuous non-polar organic (hydrocarbon) medium with a dispersing agent being a reaction product of polyisobutylene with maleic acid and/or anhydride;
 b) jetting said mixed metal oxide dispersed in said continuous medium using said dispersing agent onto said substrate to form a pigmented digital image (optionally on a pre-glaze layer(s) on a ceramic surface), wherein said pigmented digital image on said substrate develops into a colored image upon firing said ceramic substrate or heating said glass substrate to provide tempering or annealing;
 c) optionally applying a glaze over said digital image; and
 d) heating said ceramic article at an elevated temperature or heating said glass article to anneal or temper it, wherein said image from mixed metal oxide develops optimal color intensity upon heating to its color.

It is understood that the dispersing agent is generally as described above and being a reaction product of polyisobutylene with maleic acid and/or anhydride forming a PIBSA (polyisobutylene succan) and then further reacted with a non-polymeric amino ether/alcohol.

Definitions

Non-polar organic (hydrocarbon) media will mean liquids that are pourable at 25° C. and 670 mmHg atmospheric pressure, derived primarily from carbon and hydrogen and optionally having small amounts of oxygen and nitrogen. Desirably, the amount of oxygen and nitrogen combined will be less than 10 wt. % of the atoms in the organic media. Non-polar organic (hydrocarbon) will exclude low molecular weight hydrocarbons that have a boiling point of less than 40, 50 or 60° C. at 670 mmHg atmospheric pressure or binary compounds such as carbon oxides, carbides, carbon disulfide, phosgene, carbonates, etc. Desirable non-polar organic media include aliphatic and aromatic hydrocarbons. Hydrocarbon will generally mean compounds formed exclusively or almost exclusively (e.g. >95, >98, or >99 wt. %) from carbon and hydrogen. The residual 0, ≤1, ≤2, or ≤5 w. % may be other elements such as oxygen, nitrogen, halogens, etc. Desirably, the amount of aromatic rings is less than 20, more desirable less than 10, and preferably less than 5 wt. % of the organic media. The term hydrocarbyl will refer to monovalent hydrocarbon groups that may optionally include other heteroatoms (such as O, N, F, Cl, and Br) in conventional or specified amounts. The term hydrocarbylene will refer to divalent hydrocarbon groups that may optionally include other heteroatoms in conventional or specified amounts.

We will use the term hydrocarbyl to describe a hydrocarbon type group with one hydrogen removed. Hydrocarbyl in this specification will mean hydrocarbon like and can desirably include up to one oxygen and/or nitrogen for every four carbon atoms in the group, but preferably is just carbon and hydrogen atoms. For the avoidance of doubt, when we are counting carboxylic acid or carbonyl groups, we will count an anhydride of a dicarboxylic acid and an imide as having two carbonyl groups.

Desirably, the dispersions of mixed metal oxides, dispersing agent, and continuous media is adjusted to desirable viscosities for ink jet printing. Desirable viscosities include from about 1, 2 or 3 to about 15, 20, 30 or 50 cps at @ 30 $s^{-1}$ at 25° C. as measured with a cone and plate type viscometer, such as the TA 2000EX Rheometer with a 2 aluminium cone.

In one embodiment, the molecular weight of the PIBSA portion of the dispersant being a reaction product of polyisobutylene with maleic acid and/or anhydride and having a weight average molecular weight from 400 to 3000 g/mole, and preferably is from 500 to 2400 or 2500 g/mole as measured by GPC (gel permeation chromatography) using polystyrene standards.

In one embodiment, an ink comprises a dispersion of a mixed metal oxide in a non-aqueous, non-polar organic (hydrocarbon) media. In another embodiment, the ink is in the form of an ink jet ink.

In another embodiment, the ink is in an ink jet printer cartridge comprising a chamber which contains the ink including the continuous media, the dispersant, the mixed metal oxide pigments and any optional components to the dispersion or the ink.

Various preferred features and embodiments will be described below by way of non-limiting illustration.

The reaction product of polyisobutylene with maleic acid and/or anhydride (also known as PIBSA—polyisobutylene succinic anhydride reaction products) may be prepared by processes known to a skilled person. They will comprise at least one polyisobutylene chain and at least one unit derived from coupling the maleic acid and/or anhydride to the polyisobutylene. The maleic acid and/or anhydride will often lose the double bond or the double bond will migrated during coupling to a slightly different location. As these reactions typically occur above 100° C. or 150° C., any maleic acid is generally converted to maleic anhydride. The term succinic is used in lieu of maleic and refers to the same grouping of atoms but with the carbon-to-carbon double bond converted to a carbon-to-carbon single bond in the coupling reaction. The maleic anhydride ring can open forming maleic acid during the coupling reaction or after the coupling reaction or vice versus if maleic acid is used as the starting material. The reaction product of polyisobutylene with maleic acid and/or anhydride is sold commercially by many parties in the lubricating oil field (e.g., Orinite in the US and China, Texas Petroleum Corp., and Daelim in South Korea) and in emulsion explosives as polyisobutylene succinic anhydride reaction products.

There is an article on characterizing such materials titled "Characterization of Polyisobutylene Succinic Anhydride Chemistries Using Mass Spectroscopy," J. of Applied Polymer Science, Vol. 124, Issue 4, pp 2682-2996, published 2 Nov. 2011 by Edgardo Rivera-Tirado, et al. One process called the ene-type reaction does not require chlorine and uses a material called highly reactive polyisobutylene (PIB) which has a highly reactive terminal vinylidene group (called high vinylidene PIB). This first process is described in EP 1585773 and U.S. Pat. No. 6,077,909 (e.g., col. 6, line 14 through col. 7, line 62 and col. 9, line 10 through col. 10, line 11). High vinylidene PIB is made by a particular polymerization process. A second process is called the Diels-Alder type reaction and chlorine during this reaction is useful. This second process uses a low vinylidene PIB. The Diels-Alder type reaction can be higher temperature (e.g., 180-250° C.) under an inert gas (low in oxygen nitrogen or argon). The second process is described in U.S. Pat. No. 4,234,435. US 2005/0202981 paragraphs 0014-0017 also describe the reaction of polyisobutylene with maleic anhydrides to form succinated polyiosbutylenes of various structures.

The reaction product of polyisobutylene with maleic acid and/or anhydride (also known as polyisobutylene succinic anhydride) can vary in composition depending on the molar ratio of maleic anhydride to polyisobutylene and the reaction conditions. Using the number of moles of maleic anhydride is from 1 to 2, 3 or 4 relative to the number of moles of polyisobutylene. Thus, the number of maleic (sometimes referred to as succinic) anhydride groups added to each polyisobutylene can vary from 1 to 4 and usually varies from 1 to 2 or 3. The mgKOH/g gives an indication of the number of potential carboxylic acid groups derived or derivable from the ring opening the maleic anhydride. The acid number as used herein represents the number of acid groups on the polyisobutylene along with 2 times the equivalents of non-opened anhydride groups on the polyisobutylene. A factor of 2 is used on the anhydride groups because each anhydride is capable of forming 2 acid groups when the anhydride ring is opened. Usually the reaction product is also characterized by the number average molecular weight of the polyisobutylene or the number average molecular weight of the reaction product. If one has both the number average molecular weight of the polyisobutylene and the acid number, one can calculate the relative number of carboxylic acid groups per polyisobutylene chains.

The reaction product of polyisobutylene with maleic acid and/or anhydride (e.g., polyisobutylene succinic anhydride) is also referred to as hydrocarbyl-substituted acylating agent in the literature. In this disclosure, it is preferred to functionalize the anhydride or dicarboxylic acid with a non-polymeric amino ether/alcohol forming an ester, amide and/or salt linkages (including mixtures thereof), in some cases the amide linkage may convert to imide linkage when the non-polymeric amino ether/alcohol contains a primary amine. In the literature, the hydrocarbyl-substituted acylating agent can have a number average molecular weight of 500 to 2500 or 500 to 2000 g/mole. The hydrocarbyl substituent can be derived from an olefin or polyolefin. The polyolefin can be a homopolymer of a single $C_2$-$C_{10}$ olefin such as for example isobutylene or a copolymer of two or more $C_2$-$C_{10}$ olefins such as for example ethylene and propylene and optionally butadiene non-polymeric amino ether/alcohol.

The non-polymeric amino ether/alcohol desirably has a amine group and hydroxyl or ether group(s) (such as one or two) and is according to the formula:

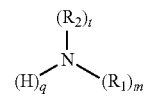

$R_1$ is a $C_{1-16}$ hydrocarbyl chain, preferably $C_{1-8}$ hydrocarbyl chain, more preferably a $C_2$, hydrocarbyl chain. Wherein the hydrocarbyl chain contains at least one hydroxyl or $C_{1-4}$ ether group, preferably hydroxyl group and optionally contains a tertiary amine or ether group;

m is 1-2, preferably 2;

$R_2$ is a $C_{1-16}$ alkyl, preferably $C_{1-8}$ alkyl, more preferably a $C_2$ alkyl chain optionally containing aromaticity if it has 6 or more carbon atoms, and/or optionally aliphatic portions; preferably $R_2$ is only aliphatic, optionally containing an ether linkage;

t: is 0-1;

q: is 1-2; and t+m+q=3.

Examples of non-polymeric amino ether/alcohol include, but are not limited to, diethanolamine, 2-(methylamino)ethanol, 2-(2-aminoethoxy)ethanol, 3-amino-1,2-propanadiol, 6-amino-1-hexanol, 2-(butylamino)ethanol, N-benzylethanolamine, bis(2-methoxyethyl)amine, N-(3-aminopropyl)diethanolamine, and N-(3-aminopropyl) diethanolamine.

The reaction between these two components (PIBSA and non-polymeric amino ether/alcohol) is then carried out at a molar ratio of 0.9:1 to 1.1:1 of succan anhydride groups of the PIBSA with a non-polymeric amino ether/alcohol. And is carried out by heating both materials to 50-150° C., preferably less than 100° C., preferably less than 80° C. for 1-24 hours, preferably 1-4 hours under a nitrogen blanket, optionally in the presence of a diluent such as mineral oil, e.g., Exxsol D140. Completion can be confirmed by IR spectra with the anhydride peaks at 1860 and 1780 cm$^{-1}$ disappearing.

The PIBSA and the non-polymeric amino ether/alcohol react together to form a mixture of ester and amide bonds generating acid groups, and leaving residual amines and ethers/alcohols. The residual amines may form salt bonds with the generated acids. Some imides may also be formed when primary amines are used.

In a preferred embodiment of the invention, the hydrocarbyl substituent is derived from a polyisobutylene which can have a vinylidene content of terminal double bonds that is low at 30% or less or that is high at 50% or more. The acylating agent can be derived from an alpha, beta-unsaturated monocarboxylic or polycarboxylic acid or reactive equivalent thereof to include an anhydride or an ester or an acid halide. Useful alpha, beta-unsaturated carboxylic acids or reactive equivalents thereof include for example methyl acrylate, fumaric acid and maleic anhydride. In an embodiment of the invention, the alpha beta-unsaturated carboxylic acid or reactive equivalent thereof is maleic anhydride. Methods to prepare a hydrocarbyl-substituted acylating agent are well known and generally involve for example heating a polyisobutylene or chlorinated polyisobutylene and maleic anhydride at 150 to 250° C., optionally in the presence of a promoter such as chlorine. One or sometimes more than one maleic group (succinic anhydride group after grafting) can be added to each polyisobutylene molecule.

In one embodiment, it is desirable that at least 50, 75 or 85 mole % of the available combine anhydride and carboxylic acid groups remain in the respective acid or anhydride form and not react with additional species (such as alcohols, amino alcohols, amines, or cationic metals) until mixed with the mixed metal oxides. It is believed in this embodiment that the anhydride or carboxylic acid groups function as better anchors to the mixed metal oxides than do salts, ester linkages, amide, or imide linkages. In another embodiment it is desirable that at least 50, 75 or 85 mole % of the measured acid number of the reaction product of polyisobutylene with maleic acid and/or anhydride be in the carboxylic acid form when combined with the mixed metal oxide. In this embodiment, it is believed that the carboxylic acid group forms a better anchoring group than the anhydride group or other derivatives of the acid or anhydride.

In another embodiment, the ink is of the type to be printed with digital versus analog technology and from an ink jet printer of the kind including piezo, thermal, acoustic and electrostatic mechanism to propel the ink from the printhead. Preferably, the printers utilized with these inks are of the piezo or electroacoustic drop on demand (DOD) type.

In another embodiment, the ink is printed on a substrate comprising either a ceramic object, e.g., tile or article including plates, bowls, saucers, cups, decorative ceramics, roofing tiles, or a glass substrate, e.g., pane or article such as a drinking glass, container, cup, etc.

Another embodiment is the ink jet ink is printed on a substrate, e.g., ceramic tiles, by single pass inline and glass articles by multi pass off line DOD printers.

The particulate solids are mixed metal oxides used in the coloration of ceramic tiles. A particular highlight includes the dispersion of metal contaminants present within the colored mixed metal oxide inorganic pigments to produce a more homogeneous color shade pattern free from streaks and striations caused by metal impurities and providing a much brighter shade.

The invention relates to the use of a class of dispersants in ceramic ink jet inks formulations, to dispersions containing such dispersants together with a particulate solid (mixed metal oxides) and a continuous non-polar organic (hydrocarbon) medium (which can comprise aliphatic hydrocarbon, non-polar fatty acid esters, and various blends thereof), and compositions comprising a particulate solid, a continuous medium and a dispersant and to their use in ceramic ink jet inks and mill-bases.

Coloration of ceramic tiles by ink jet inks is a rapidly growing technology and providing stable ink jet ink dispersions of mixed metal oxides with $D_{50}$ particle sizes below 600 nm in various continuous medium within a short milling time has been problematic.

Using the dispersant of the current application has provided stable ink jet ink dispersions containing mixed metal oxides with low particle sizes in a much reduced milling time, better filterability of the dispersions leading to increased millbase yield and reduction of waste, much brighter shades and better dispersion of metal impurities found in the mixed metal oxides.

According to the present invention, there is provided a composition comprising a particulate solid, a continuous medium (non-aqueous), and a dispersing agent having reaction product of polyisobutylene with maleic acid and/or anhydride and subsequent reaction with a non-polymeric amino ether/alcohol; used as or in part as an ink jet ink for the coloration of ceramic tiles using an ink jet ink printer.

The particulate solids can be mixed metal oxides or mixtures thereof, which may contain undesired metal impurities from abrasive wear of the milling equipment or beads, present as contaminants and/or as impurities from the milling process.

The continuous media can be aliphatic hydrocarbon media (desirably the amount of aromatic hydrocarbon is less than 20, more desirable less than 10, and preferably less than 5 wt. % of the hydrocarbon media), or blends thereof.

In one embodiment, non-polar organic (hydrocarbon) liquids are compounds containing aliphatic groups or mixtures thereof, preferably hydrocarbons of 6 to 40 carbon atoms. The non-polar organic liquids include non-halogenated aliphatic hydrocarbons (e.g., linear and branched aliphatic hydrocarbons containing six or more carbon atoms both fully and partially saturated).

In one embodiment, the preferred solvents used in the dispersion of the ceramic mixed metal oxides with the dispersant reaction product of polyisobutylene with maleic acid and/or anhydride dispersants include petroleum distillate (various boiling fractions including $C_{16-20}$ alkanes mixtures and cyclic alkanes), paraffin, mineral spirit, or mixtures thereof.

In one embodiment, the non-polar organic (hydrocarbon) liquid media is free of water. As used herein, the expression substantially free of water indicates that the reaction contains a minimal amount of water, for instance contaminant or trace amounts not removed in normal processing. In one embodiment, the non-polar organic (hydrocarbon) liquid of the continuous medium optionally contains less than 7, more desirably less than 5, and preferably less than 1 wt. % of water based on the weight of the dispersion. In one embodiment, the continuous media is free of water.

By the term "polar" in relation to the organic liquid, it is meant that an organic liquid is capable of forming moderate to strong bonds as described in the article entitled "A Three Dimensional Approach to Solubility" by Crowley, et al. in Journal of Paint Technology, Vol. 38, 1966, pg. 269. Polar organic liquids generally have a dielectric constant of 5 or more as defined in the abovementioned article. Non-polar liquids typically have a dielectric constant of less than 5.

Advantages of the current dispersing agent would be reduced milling time, better dispersion of any metal impurities and/or contaminants leading to homogeneous colored shades, brighter shades, better particle size stability during storage, improved filterability and increased dispersion/ink yield, reduced syneresis, reduced sedimentation and less phase separation between the dispersed phase and continuous phase during storage.

A preferred particulate solid is mixed metal oxides used in the coloration of ceramic tiles and glass. For the purposes of this invention, mixed metal oxides is interpreted as the solid containing at least two different metals in the same or different oxidation states. A particular improvement from using the dispersants of this disclosure includes the reduction of metal contaminants derived from abrasive wear of the milling equipment as the particular mixed metal oxides are hard to mill and require hard ceramic beads to mill these pigments. The dispersants of this disclosure tend to shorten the milling time required to meet a desirable particle size. When the total milling time on bead mills using hard ceramic beads is reduced, the amount of abrasive wear on both the beads and the internal components of the mill is generally reduced. Reducing the abrasive wear means less metal contaminants from the internal parts of the mill and the beads are introduced into the milled product. While metal contaminants are usually low in color in most pigment binder based coatings, metal contaminants can drastically affect color shade and color intensity in mixed metal oxides fired above 600° C. for coloring ceramic articles and glass.

This disclosure also provides for a method of milling a mixed metal oxide pigment having an initial volume average particle diameter in excess of 2 micron in a non-polar organic hydrocarbon) continuous phase to an average particle size of less than 700 or 600 nanometers, said process comprising:

a) blending a non-polar organic (hydrocarbon) medium, a mixed metal oxide pigment, optionally including a vitreous glaze material, having a 50% volume average particle diameter in excess of 2 micron, and a dispersing agent being a reaction product of polyisobutylene with maleic acid and/or anhydride further reacted with the non-polymeric amino ether/alcohol;

b) milling said mixed metal oxide pigment dispersed with said dispersing agent in said non-polar organic (hydrocarbon) medium using a bead mill; optionally at a milling rate of 0.4 to 8 kw/hour per kg of particulate or 5 mins to 60 hours milling time; and c) confirming that the average particle diameter of 50% volume of the particles is less than 600 nanometers. In one embodiment, the particulate material can have a dry powder volume average particle diameter $D_{50}$ in excess of 2 micrometer at the start of the milling process.

This disclosure also provides a process for digitally printing on ceramic articles or glass articles using an ink jetted through a nozzle by:

a) providing a mixed metal oxide pigment dispersed in a continuous non-polar organic (hydrocarbon) medium with a dispersing agent being a reaction product of polyisobutylene with maleic acid and/or anhydride further reacted with the non-polymeric amino ether/alcohol, and
 wherein the particulate solid is a mixed metal oxide pigment that develops its color intensity and hue after firing at elevated temperatures;

b) jetting said mixed metal oxide dispersed in said continuous medium using said dispersing agent according to a digital image to form an image on a substrate (optionally on a pre-glaze layers on a ceramic surface) that develops color intensity on said ceramic or glass article during firing; and c) optionally applying a glaze over said digital image; and d) firing said ceramic article at a temperature above 600° C. or tempering or annealing said glass article at a temperature above 400° C. to cause said mixed metal oxide to develop its color.

The pre-glaze layer can be applied using traditional methods such as a curtain coater or spray coater. Alternatively, the pre-glaze layer could be applied using ink jet printer technology. Said pre-glaze layer above can be a single pre-glaze layer or multi pre-glaze layers. A pre-glaze layer is usually applied to help smooth the surface of a ceramic substrate and optionally adds components to the surface of the ceramic or glaze to optimize properties of the finished ceramic article. The pre-glaze layer(s) can include colorants.

It has been found that certain dispersants show excellent ability to disperse inorganic pigments (particularly those mixed metal oxides) to produce colloidally stable non-aqueous dispersions, non-aqueous ink jet ink dispersions and final non-aqueous ink jet inks for the coloration of ceramic tiles or glass using ink jet ink printers. Thus, according to the present invention, there is provided an ink jet ink composition comprising a mixed metal oxide particulate solid, a continuous medium and a dispersing agent being a reaction product of polyisobutylene with maleic acid and/or anhydride further reacted with a non-polymeric amino ether/alcohol.

INDUSTRIAL APPLICATION

Coloration of ceramic tiles by ink jet ink technology is a rapidly growing application due to the variety and quality of images available for digital printing via ink jet inks. The particle size of the mixed metal oxides used in older printing processes for ceramic articles and tiles were often too large to easily pass through the nozzles of most ink jet printers. Providing colloidally stable ink jet ink dispersions of mixed metal oxides with $D_{50}$ particle sizes below 600 nm in various continuous medium within a short milling time has been problematic.

In one embodiment, the compound of Formula 1 is a dispersant for mixed metal oxide pigments of the type used to color ceramic articles such as ceramic tiles or glass where the pigments are going to be exposed to firing at 600° C. and above to cause the pigments to go from a low intensity color to an intense permanent color.

The particulate solid present in the composition may be any inorganic solid material (such as a pigment or glaze forming compound which is substantially insoluble in the non-polar organic (hydrocarbon) medium) and which after firing at elevated temperatures provides a desirable color. In one embodiment, the particulate solid is a pigment. In another embodiment, the particulate solid is or includes an aluminium or silica rich compound that helps form the glaze compound.

In one embodiment, the ink composition of the invention provides improved jetting efficiency, reduce nozzle plugging, reduced settling, easier filterability, less frequent filter plugging, and more consistent jetting in applications where a mixed metal oxide pigment is jetted onto a ceramic article, such as a ceramic tile, roofing tile, plate, saucer, bowl, etc., or on glass article such as a pane, drinking glass, or in accordance with a digital image. In this application, the use of the dispersants of this disclosure result in low concentrations of metal and metal oxide wear contaminants from the milling equipment and beads/balls. In one embodiment, the composition provided lower pigment particle size, better colloidal stability, lower amounts of entrained metal from the internal mill surfaces and beads.

Preferred pigments for coloration of ceramic objects or glass are Pigment Yellow 159 (Zr—Si—Pr, zircon praseodymium yellow or praseodymium yellow zircon) such as BASF Sicocer® F. Yellow 2200 and 2214; BASF Sicocer F Pink 10307; Pigment Red 232 (Zr—Si—Fe zircon) such as BASF Sicocer® F Coral 2300; Pigment Red 233 (Ca—Sn—Si—Cr, chrome tin pink sphene); Pigment Brown 33 (Zn—Fe—Cr, Spinel) such as BASF Sicocer® Brown 2700 and 2726; Pigment Blue 72 (Co—Al—Cr, Cobalt Spinel blue); Pigment Blue 28 (Co—Al spinel) such as BASF Sicocer®

Blue 2501; Pigment Blue 36 (Co—Al spinel) such as BASF Sicocer® Cyan2500; Pigment Black 27 (Co—Mn—Fe—Cr spinel) such as BASF Sicocer® Black 2900; and Pigment White 12 (Zr—Si) such as BASF Sicocer® White EDT/AK-4409/2.

If desired, the compositions may contain other optional ingredients, e.g., resins (where these do not already constitute the organic medium), binders, fluidizing agents, anti-sedimentation agents, plasticizers, surfactants, anti-foamers, rheology modifiers, leveling agents, gloss modifiers and preservatives.

The compositions typically contain from 20 to 40 or 60% by weight of the particulate solid, the precise quantity depending on the nature of the solid and the relative densities of the solid and the continuous medium. For example, a composition in which the solid is an inorganic material, such as an inorganic pigment, filler or extender, in one embodiment contains from 20 to 60% by weight of the solid based on the total weight of composition.

The composition may be prepared by any of the conventional methods known for preparing dispersions for coloration of ceramic articles fired above 600° C. or for glasses annealed or tempered above 400° C. Thus, the solid, the continuous medium and the dispersant may be mixed in any order, the mixture then being subjected to a mechanical treatment to reduce the particles of the solid to an appropriate size, for example, by ball milling, bead milling, gravel milling or plastic milling until the dispersion is formed. It is anticipated that a variety of particle size and dispersing equipment can be used sequentially to minimize total milling time and expense, such that a large particle size pigment can be dispersed in a continuous media with the dispersant, an initial pre-mix or pre-mill grinding to a desired particle size range, and then transfer to a bead type mill to further break down particulate particles into the $D_{50}$ 200-600 nanometer diameter (by volume average particle size measurements).

In one embodiment, the beads used to mill the mixed metal oxide pigments are a ceramic bead rather than a metal bead. In further embodiments using ceramic beads, it is desirable that the ceramic beads are zirconium dioxide, yttrium stabilized zirconia, and/or silicon carbide. The beads are often 0.3 to 0.4 mm in diameter. The mills are often horizontal bead mills and a popular supplier of the mills is Netzsch. The milling often targets a medium value of the particle size distribution where a volume average particle diameter of $D_{50}$ of 600 or 300 nm or less and a $D_{90}$ of 800 or 500 nm or less is achieved. A $D_{50}$ of 300 nm is a value in which 50% of the particles present in a particle size distribution have diameters greater than 300 nm and 50% have diameters below 300 nm. Milling times are from about 5 minutes to 60 hours, and more desirably from about 5 minutes to 48 hours. In one embodiment, the energy used by the mill over the time period disclosed above ranges from 0.4 to 8 kw/hour per kg of particulate produced to give $D_{50}$ particles in the range disclosed above. The mills may use some classification methods to separate smaller particles from larger particles and then mill the different sized particles to different extents. Solvent may be added during milling to control viscosity, solids contents, etc. Dispersant may be added sequentially or continuously during milling as milling increases the surface area of a gram of pigment and it reduces its $D_{50}$ average particle size from in excess of 2 micron to less than 600, 500 or 300 nanometer.

While not wishing to be bound by theory, it is hypothesized that some dispersants are more effective at getting to newly created surfaces during milling and stabilizing the new surfaces of fractured particles against aggregation into larger particles. Some dispersants are better anchored to particulates and better colloidally stabilize the particles during high energy mixing against agglomeration into larger sized particles.

In one embodiment, the dispersants being a reaction product of polyisobutylene with maleic acid and/or anhydride further reacted with non-polymeric amino alcohol or amino ether (also described as amino ether/alcohol) can be used to make self-dispersable or re-dispersable pigment concentrates for coloring ceramic articles. In this embodiment, a continuous media that can be evaporated off or removed by centrifugation can be used to conduct the milling and then the pigment with dispersant thereon can be concentrated, stored, shipped etc., until needed in dispersion form. If a composition is required comprising a particulate solid and a dispersant being a reaction product of polyisobutylene with maleic acid and/or anhydride further reacted with non-polymeric amino ether/alcohol in dry form, the organic liquid is typically volatile so that it may be readily removed from the particulate solid by a simple separation means such as evaporation. In one embodiment, the composition comprises an organic (hydrocarbon) liquid continuous media having the prescribed low levels of water or free of water.

The compositions of the invention are suitable for preparing mill-bases wherein the particulate solid is milled in an organic (hydrocarbon) liquid in the presence of a compound being a reaction product of polyisobutylene with maleic acid and/or anhydride further reacted with non-polymeric amino ether/alcohol. These mill-bases can be mixed in precise ratios to form colorants for ceramic articles having specific color intensity and shade. It is anticipated that colorants for application by ink jet technology will comprise at least 3 and up to 12 different colors that can be ink jetted to form a variety of colors, shades, intensities, etc., on ceramic articles after firing at 600° C. or more.

Typically, the mill-base contains from 20 to 60% by weight particulate solid based on the total weight of the mill-base. In one embodiment, the particulate solid is not less than 20 or not less than 25% by weight of the mill-base. Such mill-bases may optionally contain a binder added either before or after milling.

The amount of dispersant in the mill-base is dependent on the amount of particulate solid but is typically from 0.1 or 1 to 20% by weight of the mill-base.

Dispersions and mill-bases made from the composition of the invention are particularly suitable as pigment dispersions for use in solvent-based inks for ceramic articles especially ink jet printed ceramic objects that are fired at 600° C. or above to develop the pigment color characteristic such as wall and floor tiles.

This disclosure also includes a process for digitally printing on ceramic article or glass article using an ink jetted through a nozzle by:

a) providing a mixed metal oxide pigment dispersed in a continuous non-polar organic (hydrocarbon) medium with a dispersing agent being a reaction product of polyisobutylene with maleic acid and/or anhydride further reacted with non-polymeric amino ether/alcohol;

b) jetting said mixed metal oxide dispersed in said continuous medium and said dispersing agent according to a digital image to form an image that develops on said ceramic article or glass article during firing (wherein said ceramic article optionally has one or more pre-glaze layer(s) thereon prior to receiving said digital image);

c) optionally applying a glaze over said digital image; and d) firing said ceramic article or glass article at an elevated temperature to cause said mixed metal oxide to develop its color.

The coatings or inks made from mixed metal oxide dispersions and dispersants of this specification differ from conventional organic binder based coatings and inks in two additional details. In a preferred embodiment, the binder (if any) in the coatings and inks of this specification are substantially (e.g. ≥90 wt. %, ≥95 wt. %, or ≥99 wt. % based on the dried and heat treated coating or ink) inorganic material rather than organic material. A second significant difference is that the dispersants of this specification are significantly volatilized or burned away (e.g. ≥80 wt. %, ≥90 wt. %, or ≥99 wt. % of the dispersant is volatilized or burned away based on the weight of the dispersant prior to heat treatment). Thus, in organic binder systems the organic dispersant is retained in the final ink or coating as an interface between the binder and the particulate matter. In the inks and coatings of this specification, the dispersant is only present until the heat treatment of the article and the coating or ink to melt and fuse the ink to the ceramic or glass substrate. After the heat treatment, the dispersant is substantially burned away or volatilized so that the coating or ink and the particulate (e.g., pigment (mixed metal oxide) or vitreous material of the glaze) is substantially free of any organic dispersant at the interface between the particulate and the inorganic materials of the ceramic or glass.

Ceramic articles will generally mean a variety of useful and decorative items formed from clay and porcelain that develop additional strength from an elevated temperature treatment (such as about 400 to about 1200° C.) that fuses the inorganic material providing additional mechanical strength and resistance to liquids. They include, but are not limited to, tiles in various sizes and shapes, cups, jars, crocks, other storage vessels, bowls, plates, utensils, jewelry, bricks, floor, ceiling, and wall tiles, etc. The ceramic articles can be intended for use inside a dwelling or for exterior use such as in building construction.

Glass articles include functional and decorative glass articles. Glass differs from ceramic in that ceramic is generally translucent at best where glass (unless intensely colored) is generally transparent in thicknesses of about 0.5 mm such that size ten type can be read through glass panes under normal sunlight conditions. For the purpose of this specification, glass articles will generally have high concentrations of silica (e.g., $SiO_2$) of at least 50% by weight based on the entire glass portion of the article. Examples of glass compositions include lead-oxide glass at 59 wt. % silica, 2 wt. % $Na_2O$, 25 wt. % PbO, 12 wt. % $K_2O$, 0.4 wt. % alumina and 1.5 wt. % Zn; sodium borosilicate glass with about 81 wt. % silica, 12 wt. % $B_2O_3$, 4.5 wt. % $Na_2O$, and 2 wt. % $Al_2O_3$; soda-lime-silica window glass with about 72 wt. % silica, 14.2 wt. % $Na_2O$, 25 wt. % MgO, 10 wt. % CaO, and 0.6 wt. % $Al_2O_3$, and fused silica glass with 95+wt. % silica. Glass articles can generally include, but is not limited to, glass panes (including curved and non-flat panes), tubes, vials, bottles, beakers, flasks, glasses, cups, plates, bowls, pans, lenses, vessels, jars, spheres/balls, etc. In the past, screen printing has been used to decorate some glass containers and articles with mixed metal oxide type pigments formed into an inorganic ink. These can somewhat permanently identify the contents with source, content, or trademark identification.

The following examples provide illustrations of the invention. These examples are non-exhaustive and are not intended to limit the scope of the invention.

EXAMPLES

List of Dispersant Ingredients

PIBSA A: polyisobutlyene succinate ended with a MW of 1000 which was made via a direct addition route.

PIBSA B: polyisobutlyene succinate ended with a MW of 1000 which was made via a chloride route.

PIBSA C: polyisobutlyene succinate ended with a MW of 550 which was made via a direct addition route.

Diethanolamine: Ex Sigma Aldrich

SN100: Ex Fred Holmberg

Exxsol D140: Ex ExxonMobil 2-(Methylamino)ethanol: ex Sigma Aldrich 2-(2-Aminoethoxy)ethanol: ex Sigma Aldrich 3-Amino-1,2-propanadiol: ex Sigma Aldrich 6-Amino-1-hexanol: ex Sigma Aldrich 2-(Butylamino)ethanol: ex Sigma Aldrich N-Benzylethanolamine: ex Sigma Aldrich Bis(2-methoxyethyl)amine: ex Sigma Aldrich N-(3-Aminopropyl)diethanolamine: ex Tokyo Chemical Industry UK Ltd.

Tris(hydroxymethyl)aminomethane: ex Sigma Aldrich

N-Methyl-D-glucamine: ex Sigma Aldrich

Dispersants

Comparative Example 1: Polyester B from U.S. Pat. No. 3,778,287

Method

PIBSA, amine and solvent are charged to reaction vessel and heated to 70° C. under a blanket of nitrogen, reaction mixture stirred for 2 hours, reaction then poured off.

TABLE 1

Dispersants

| Dispersant | PIBSA | Amine | Solvent |
|---|---|---|---|
| 1 | PIBSA A, 130.9 parts by wt. | Diethanolamine 25.81 parts | SN100 156.71 parts |
| 2 | PIBSA B 14.72 parts | Diethanolamine 1.99 parts | SN100 15.29 parts |
| 3 | PIBSA C 65.45 parts | Diethanolamine 10.75 parts | Exxsol D140 76.2 parts |
| 4 | PIBSA A, 58.95 parts | 2-(methylamino)-ethanol 4.94 parts | Exxsol D140 63.89 parts |
| 5 | PIBSA A, 47.35 parts | 2-(2-Aminoethoxy)-ethanol 5.55 parts | Exxsol D140 52.9 parts |
| 6 | PIBSA A, 51.54 parts | 3-Amino-1,2-propandiol 5.24 parts | Exxsol D140 56.78 parts |
| 7 | PIBSA A, 52.71 parts | 6-Amino-1-hexanol 6.89 parts | Exxsol D140 59.6 parts |
| 8 | PIBSA A, 51.93 parts | 2-(butylamino) ethanol 6.79 parts | Exxsol D140 58.72 parts |
| 9 | PIBSA A, 54.62 parts | N-Benzylethanolamine 9.2 parts | Exxsol D140 63.82 parts |
| 10 | PIBSA A, 54.97 parts | Bis(2-methoxyethyl)-amine 8.16 parts | Exxsol D140 63.13 parts |
| 11* | PIBSA A, 53.56 parts | Diethanolamine 6.28 parts | Exxsol D140 59.84 parts |
| 12# | PIBSA A, 1403.0 parts | N-(3-Aminopropyl) diethanolamine 242.8 parts | Exxsol D140 410.7 parts |

TABLE 1-continued

Dispersants

| Dispersant | PIBSA | Amine | Solvent |
|---|---|---|---|
| 13** | PIBSA A, 145.01 parts | Tris(hydroxymethyl) aminomethane 19.59 parts | Exxsol D140 164.6 parts |
| 14## | PIBSA A, 164.03 parts | N-Methyl-D-glucamine 35.70 parts | Exxsol D140 199.73 parts |

*Reaction carried out at 150° C., not 70° C.
Reaction carried out at 110° C. for 1 hour, then 150° C. for 3 hours.
**Reaction carried out at 70° C. for 1 hour, then 100° C. for 6 hours, then 150° C. for 4 hours.
Reaction carried out at 70° C. for 1 hour, then 100° C. for 1 hour, then 140° C. for 2 hours, then 150° C. for 4 hours. And, final reaction mixture passed through a 150NM filter to remove a small amount solid material.

Applications Testing

Pigment Brown Dispersions—Premix Dispersions are prepared by dissolving dispersants (16.8 parts) in Exsol D140 (ex. ExxonMobil) (700 parts). Colorificio Brown 79105D pigment (280 parts) was added to each mixture and each were premixed using a saw tooth impeller at 2000 rpm for 60 minutes.

Each premix was then milled using a Netzsch LAb Star/Mini Mill and a "mini" grinding chamber (0.161) under the following conditions: a 75% bead charge of 0.3-0.4 mm YTZ beads at 4000 rpm, a pump speed of 15 rpm and a mill temperature of 30-40° C.; for 150 minutes. Particles sizes were obtained by taking a sample of the milling dispersion (0.04 parts) and diluting in toluene (8 parts) and measuring the particle size on a Nanotrac DLS particle size analyzer. Viscosity measurements of the dispersions were obtained using a TA 200EX Rheometer with a 2° aluminium cone at a temperature of 25° C.

Filterability was carried out by pushing 25 ml of the millbase through a 5 ul syringe filter until no more sample would come through the filter or no more material remained.

Particle Size (PS) percentage change was carried out by measuring the particle size of the ink imminently after milling and then storing the ink for 3 weeks at 40° C. and then re-measuring the particle size.

Sedimentation ratios were carried out on ink that had been stored for 3 weeks at 40° C. and this was done by simply decanting and weighing the supernatant. Redispersion was carried out by placing the ink on rollers at 120 rpm for 10 minutes. It is an object of this disclosure to develop dispersants to minimize increases in particles sizes after dispersion and/or to minimize sedimentation of mixed metal oxides during storage.

TABLE 2

Dispersion Characteristics

| Agent | Inital Filtr-ability | % PS change $D_{50}$ | % PS change $D_{90}$ | Sedimentation wt % after redispersion | Sedimentation wt % without redispersion |
|---|---|---|---|---|---|
| Dispersant 1 | 19 ml | 4% | 1% | 0% | 20.44% |
| Dispersant 2 | 25 ml | 9% | 7% | 26.26% | 69.58% |
| Dispersant 3 | 16 ml | 14% | 3% | 10.02% | 47.76% |
| Dispersant 4 | 19 | 12% | 1% | 9.83 | 35.30 |
| Dispersant 5 | 23 | 6% | 4% | 18.44 | 50.94 |
| Dispersant 6 | 24 | 4% | 1% | 0.00 | 13.56 |
| Dispersant 7 | 24 | 0% | 1% | 9.98 | 34.43 |
| Dispersant 8 | 25 | 6% | 1% | 22.88 | 61.44 |
| Dispersant 9 | 24 | 7% | 12% | 18.91 | 48.19 |
| Dispersant 10 | 23 | 2% | 14% | 27.00 | 57.55 |
| Dispersant 11 | 24 | 6% | 2% | 5.82 | 41.67 |
| Dispersant 12 | 23 | 8% | 11% | 34.47 | 74.41 |
| Comparative Example 1 | 14 ml | 12% | 16% | 28.93% | 84.67% |

While the invention has been explained in relation to its preferred embodiments, it is to be understood that various modifications, thereof, will become apparent to those skilled in the art upon reading the specification. Therefore, it is to be understood that the invention disclosed herein is intended to cover such modifications as fall within the scope of the appended claims.

What is claimed is:

1. A pigment dispersion composition comprising:
   a) 20-79 wt. % of a continuous phase liquid hydrocarbon media;
   b) 20-60 wt. % of a mixed metal oxide ceramic pigment in particulate form that develops its full color intensity and hue after firing at elevated temperatures; and
   c) 0.1-20 wt. % dispersant, said dispersant comprising the reaction product of polyisobutylene with maleic acid and/or anhydride of maleic acid under reaction conditions for form a polyisobutylene with dicarboxylic acid or succan anhydride groups chemically bonded thereto knowns as PIBSA, polyisobutylene succan; this polyisobutylene succan is reacted on a non-polymeric amino ether/alcohol in a molar ratio of 1:0.9 to 1:1.1 of anhydrides of the PIBSA to non-polymeric amino ether/alcohol to form said dispersant.

2. The composition according to claim 1, wherein said reaction product of polyisobutylene with maleic acid and/or anhydride has a number average molecular weight from 500 to 2500 g/mole and an acid number from 40 to 200 mgKOH/g of dispersant, and said non-polymeric amino either/alcohol has the formula:

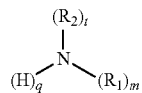

wherein $R_1$ is a $C_{1-16}$ hydrocarbyl chain, wherein the hydrocarbyl chain contains at least one hydroxyl or $C_{1-4}$ ether group and optionally contains a tertiary amine;

m is 1-2;

$R_2$ is a $C_{1-16}$ alkyl, optionally containing aromaticity, $R_2$ optionally containing an ether linkage;

t is 0-1;

q is 1-2; and t+m+q=3.

3. The composition according to claim 1, wherein said continuous phase comprises an aliphatic hydrocarbon and optionally up to 20 wt. % of aromatic hydrocarbon, based on the weight of the continuous phase.

4. The composition as claimed in claim 1, wherein the particulate solid is at least one ceramic pigment of mixed metal oxides which contain a combination of two or more elements in cationic form selected from the group consisting of Al, Mg, Ca, Cd, Co, Cr, Fe, In, Mn, Ni, Pr, Sb, Se, Si, Sn, Ti, V, Zn and Zr.

5. A process for milling an inorganic mixed metal oxide particulate, having a dry powder volume average particle diameter $D_{50}$ in excess of 2 micron, in a continuous hydrocarbon medium to a $D_{50}$ particle size of less than 600 nanometers, said process comprising:
   a) blending said continuous hydrocarbon medium, said inorganic mixed metal oxide particulate, wherein said inorganic mixed metal oxide particulate is a mixed metal oxide pigment that develops its color intensity and hue after firing at elevated temperatures, and a dispersing agent comprising a reaction product of polyisobutylene with maleic acid and/or maleic anhydride and thereafter said acid or anhydride being reacted with a non-polymeric amino ether/alcohol to form at least one of ester, amide, imide and salt bonds between the amino ether/alcohol and said reaction product of polyisobutylene with maleic acid and/or maleic anhydride, optionally said hydrocarbon medium, mixed metal oxide particulate and dispersing agent including a vitreous glaze material, having a dry powder volume average particle diameter in excess of 2 micron;
   b) milling said mixed metal oxide pigment dispersed with said dispersing agent in said continuous medium using a bead mill for 5 minutes to 60 hours forming a dispersion of said mixed metal oxide in said continuous medium; and
   c) confirming the volume average particle diameter $D_{50}$ is less than 600 nanometers.

6. The process according to claim 5, wherein said mixed metal oxide pigment contains a combination of two or more different elements in the form of cations selected from the group of Al, Mg, Ca, Cd, Co, Cr, Fe, In, Mn, Ni, Pr, Sb, Se, Si, Sn, Ti, V, Zn and Zr.

7. The process of claim 5, wherein the continuous media comprises less than 7 wt. % water based on the weight of the dispersion and said non-polymeric amino ether/alcohol is according to the formula:

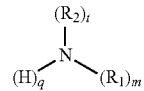

wherein $R_1$ is a $C_{1-16}$ hydrocarbyl chain, wherein the hydrocarbyl chain contains at least one hydroxyl or $C_{1-4}$ ether group and optionally contains a tertiary amine;

m is 1-2;

$R_2$ is a $C_{1-16}$ alkyl, optionally containing aromaticity, $R_2$ optionally containing an ether linkage;

t is 0-1;

q is 1-2; and t+m+q=3.

8. The process of claim 7, wherein the continuous media comprises a hydrocarbon with less than 5 wt. % water based on the weight of the dispersion.

9. The process of claim 5, wherein said reaction product of polyisobutylene with maleic acid and/or anhydride has a number average molecular weight from 500 to 2500 g/mole.

10. The process of claim 5, wherein said non-polar hydrocarbon continuous phase has a molecular weight from about 200 to about 20,000 g/mole and is comprised of mostly carbon and hydrogen with up to 10 wt. % of combined heteroatoms selected from nitrogen and oxygen based on the weight of said hydrocarbon continuous phase.

* * * * *